United States Patent
Bova et al.

(10) Patent No.: US 10,854,111 B2
(45) Date of Patent: Dec. 1, 2020

(54) SIMULATION SYSTEM AND METHODS FOR SURGICAL TRAINING

(71) Applicant: University of Florida Research Foundation, Incorporated, Gainesville, FL (US)

(72) Inventors: Frank J. Bova, Gainesville, FL (US); William Alan Friedman, Gainesville, FL (US)

(73) Assignee: University of Florida Research Foundation, Inc., Gainesville, FL (US)

( * ) Notice: Subject to any disclaimer, the term of this patent is extended or adjusted under 35 U.S.C. 154(b) by 372 days.

(21) Appl. No.: 14/300,561

(22) Filed: Jun. 10, 2014

(65) Prior Publication Data
US 2014/0370475 A1     Dec. 18, 2014

Related U.S. Application Data

(60) Provisional application No. 61/834,033, filed on Jun. 12, 2013.

(51) Int. Cl.
*G09B 23/00* (2006.01)
*G09B 23/28* (2006.01)
(Continued)

(52) U.S. Cl.
CPC ........... *G09B 23/285* (2013.01); *G09B 23/00* (2013.01); *G09B 23/28* (2013.01); *G09B 23/281* (2013.01);
(Continued)

(58) Field of Classification Search
CPC .................................................. G09B 23/285
(Continued)

(56) References Cited

U.S. PATENT DOCUMENTS

| 5,605,531 A * | 2/1997 | Lane | A61B 1/042 348/74 |
| 6,470,207 B1 * | 10/2002 | Simon | A61B 34/20 378/207 |

(Continued)

FOREIGN PATENT DOCUMENTS

| WO | 1999042978 A1 | 8/1999 |
| WO | 2011136778 A1 | 11/2011 |
| WO | 2012058533 A2 | 5/2012 |

OTHER PUBLICATIONS

Boix, Jaume. Lorenzo-Zuniga, Vincente. World Journal of Gastrointestinal Endoscopy. 'Radiation dose to patients during endoscopic retrograde cholangiopancreatography.' Published online Jul. 16, 2011 at <http://www.ncbi.nlm.nih.gov/pmc/articles/PMC3159502>. Accessed Jul. 6, 2016. pp. 1-8.*

(Continued)

*Primary Examiner* — James B Hull
(74) *Attorney, Agent, or Firm* — Thomas Horstemeyer, LLP (57) ABSTRACT

A three-dimensional radiological image of a living being is acquired and an anatomical feature of interest therein is identified. A three-dimensional print of the feature is created; the print has haptic characteristics that are similar to those of the anatomical feature of interest. The print is incorporated into a model upon which a medical student can simulate a surgical operation.

A simulator is provided; the simulator simulates the operation of a c-arm fluoroscope. This enables the medical student to simulate surgery while operating a fluoroscope.

14 Claims, 9 Drawing Sheets

(51) Int. Cl.
 *G09B 23/34* (2006.01)
 *G09B 23/30* (2006.01)
(52) U.S. Cl.
 CPC ............ *G09B 23/30* (2013.01); *G09B 23/303* (2013.01); *G09B 23/34* (2013.01)
(58) Field of Classification Search
 USPC ........................................................ 434/267
 See application file for complete search history.

(56) References Cited

U.S. PATENT DOCUMENTS

| | | |
|---|---|---|
| 6,490,475 B1 | 12/2002 | Seeley et al. |
| 7,386,339 B2 | 6/2008 | Strommer et al. |
| 2002/0035321 A1 | 3/2002 | Bucholz et al. |
| 2006/0008786 A1* | 1/2006 | Feygin ................. G09B 23/285 434/262 |
| 2012/0280988 A1 | 11/2012 | Lampotang et al. |

OTHER PUBLICATIONS

Wu, Y. Ted. 3D Doctor. 'From CT Image to 3D Model'. Published online Aug. 2001. Accessed Jul. 11, 2016 from <http://www.ablesw.com/3d-doctor-surgmod.html>. pp. 1-3.*

Yudkowsky, Rachel, Practice on an Augmented Reality/Haptic Simulator and Library of Virtual Brains Improves Residents' Ability to Perform a Ventriculostomy, Simulation in Healthcare: The Journal of the Society for Simulation in Healthcare, Feb. 2013—vol. 8—Issue 1—pp. 25-31.

* cited by examiner

SIMULATION SYSTEM AND METHODS FOR SURGICAL TRAINING

BACKGROUND OF THE INVENTION

The invention relates to surgery, and more particularly relates to surgical training. In its most immediate sense, the invention relates to training surgeons to perform operations using models of the human body.

Medical students have long been trained to practice the performance of surgical procedures by carrying those procedures out on models of the human body. While such training is useful, existing model-based training methods suffer from two disadvantages.

The first disadvantage comes about because models used to train surgeons have standardized forms. For example, a model of the human spine will usually show a spinal structure in which the discs are properly formed and properly spaced from each other, and a model of a human head will have the various bones and tissues in places where a physician would expect those bones and tissues to be. However, patients requiring surgery seldom conform to such standardized models. For example, a pediatric patient will have a very different body structure than an adult, a patient with spinal birth defects may have an unusually-shaped spinal structure, etc. Thus, a physician who practices a particular operation on a model may not be adequately prepared to perform that operation on a living patient.

The second disadvantage is that operations that are carried out using a c-arm fluoroscope require skills that cannot be taught merely by operating on a model. For example, when a surgeon treats a patient's trigeminal neuralgia, the surgeon needs to know the exact structure of the patient's head before inserting the RF ablation needle, and the surgeon also needs to confirm that the position of the needle is proper while the operation is being carried out. For these to occur, the surgeon must configure the fluoroscope properly, i.e. must move the c-arm to a position where the surgeon can have an appropriate view of the patient's anatomy and the current position of the needle. Additionally, the surgeon must properly adjust the operating characteristics of the fluoroscope, i.e. must adjust the display to show the anatomical structures of interest and must not subject the patient to an excessive radiation dose while operating.

It would be advantageous to provide methods and apparatus that would better train medical practitioners to perform operations using a model of the human body.

It would further be advantageous to provide methods and apparatus that would enable medical practitioners to practice a particular operation on models of different types of patients so as to be able to quickly assess the proper way to proceed. For example, it would be advantageous for a medical practitioner to achieve proficiency in practicing a particular operation by practicing it on a model of an adult patient, on a model of a pediatric patient, on a model of an obese patient, on a model of a patient whose anatomy has been altered by disease or trauma, etc.

It would still further be advantageous to provide methods and apparatus that would train medical practitioners to operate a fluoroscope while performing surgery on a patient.

These and other advantages are achieved in accordance with the invention.

The invention proceeds from the realization that three-dimensional printing can be used to make models upon which practice surgical operations can be simulated. Thus, a three-dimensional radiological image of a region of a patient can be acquired using e.g. a CT scanner or MR imager, anatomical structures of interest in that region can be identified, and three-dimensional prints of those structures can be printed out to serve as a model upon which a surgical operation can be practiced. Thus, in accordance with the invention, a plurality of models taken from different body types can be printed out so that a medical practitioner can practice the same operation on different patient types.

Advantageously although not necessarily, the various three-dimensional prints can be made of materials having haptic characteristics similar to those of the structures themselves. In this way, a medical practitioner practicing the operation will feel something similar to what he or she will feel during an actual surgery on a patient.

The invention further proceeds from the realization that the acquired three-dimensional radiological image can be used in a simulation of a fluoroscopic image such as would be displayed during an actual surgical operation. Thus, in accordance with the invention, a fluoroscope simulator is provided. The acquired three-dimensional radiological image is stored in the simulator or can be made immediately available by computation if sufficient computer resources are available. The simulator is provided with controls simulating the operating characteristics and configuration of a fluoroscope and is also provided with a display.

A fluoroscopic image such as would be displayed during an actual surgical operation will show the anatomy of interest together with the position of the surgical instrument used in the operation. Accordingly, a first means in the simulator registers the spatial location and orientation of the above-referenced printed-out model. A three-dimensional imitation of an actual surgical instrument is also provided, and a second means in the simulator registers the spatial location and orientation of the imitation instrument.

The simulator display displays a simulated fluoroscopic image corresponding to the spatial locations and positions of the model and the imitation instrument, and the simulated fluoroscope operating characteristics and configuration.

Thus, in accordance with the invention, a medical practitioner can use the imitation instrument to practice an operation upon the model, while operating the controls of the simulator to simulate operating a fluoroscope. The simulator uses the stored three-dimensional radiological image, together with the simulated fluoroscope configuration and operating characteristics and the location and orientation of the model, to produce on the display a simulated fluoroscopic image such as would be displayed during an actual surgery. Furthermore, the simulator uses the spatial location and orientation of the imitation instrument to superimpose an image of the imitation instrument on the fluoroscopic image. In this way, the medical student or surgeon can have an experience that simulates performing the surgery on an actual patient.

DETAILED DESCRIPTION OF PREFERRED EMBODIMENTS

In the Figures, the same element is always indicated by the same reference numeral. The Figures are not to scale, and details may be enlarged or eliminated for clarity. Corresponding elements in different embodiments are indicated using primed reference numerals.

This description assumes that the invention will be used by a medical student to simulate surgical operations carried out on a human being. However, the invention can also be used by a surgeon to refresh his or her skills or to learn new or advanced skills, and the invention can also be used to practice surgery on animals.

Figure 1:
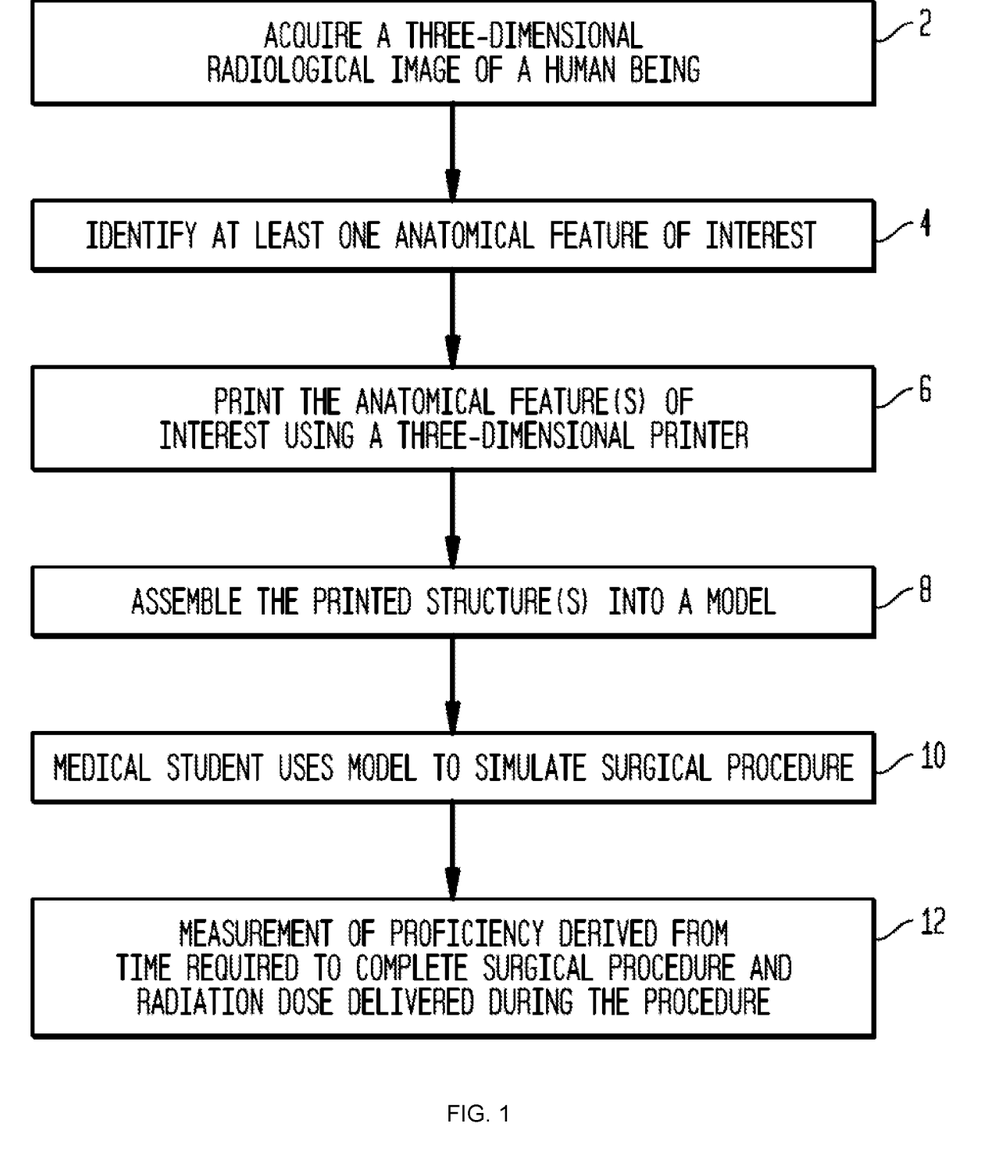
FIG. 1 is a flow chart that schematically explains a preferred embodiment of the invention and its use.

In accordance with a preferred embodiment of the invention, in an initial step 2, a three-dimensional radiological image (not shown) is acquired of a region (not shown) of a human being (not shown). This image acquisition can be carried out by e.g. using a CT scanner, an MR imager, or any other medical imaging modality. If for example the invention is to be used help persons develop proficiency in spinal surgery, the region will be the person's spine; if the invention is to be used to help persons develop proficiency in treating trigeminal neuralgia, the region will be the person's head. It will be evident that a library of such images can be created, with the choice of persons and regions being determined by the applications intended.

In a subsequent step 4, one or more anatomical structures of interest are identified in the radiological image. If for example the invention is to be used to develop proficiency in spinal surgery, one such anatomical structure of interest might be the lumbar spine 109. If alternatively the invention is to be used to help persons develop proficiency in treating trigeminal neuralgia, the anatomical structures of interest will be third branch of the trigeminal nerve which exits the skull base at in the foramen ovale.

Figure 3:
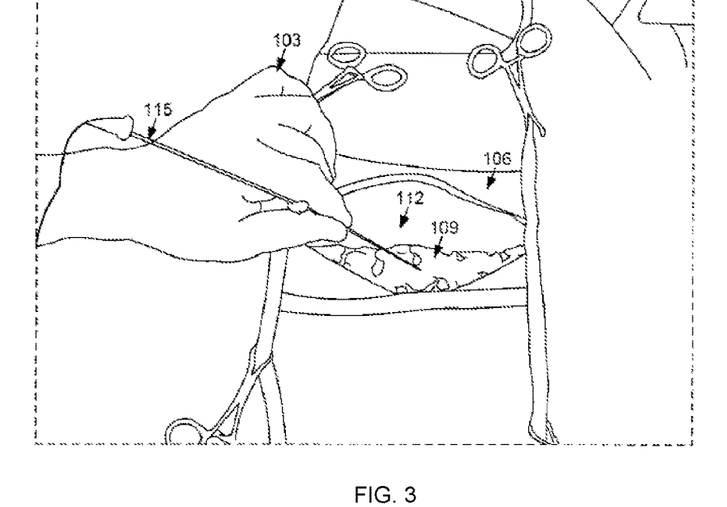
FIG. 3 schematically illustrates a model of a back torso as used in a preferred embodiment of the invention.

Thereafter, in step 6, the anatomical structures of interest (e.g. the lumbar spine 109) are printed using a three-dimensional printer (not shown). Advantageously, the materials used to print these anatomical structures have haptic characteristics that are similar to the structures themselves. For example, the material can be a silicone based material that provides the same tactile feedback as skin when punctured by a needle or scalpel, or a solid material that feels like bone when drilling. In this way, a medical student (the student's hand 103 is shown in FIG. 3) simulating the operation will feel something similar to what he or she will feel during an actual surgery on a patient.

In step 8, the printed structures are assembled together with other components to form a model (e.g. a head 303 with artificial skin 306 and other elements that will be discussed below) upon which surgery can be practiced using an imitation surgical instrument 115 that will be described in more detail below.

In step 10, a medical student uses the imitation instrument 115 to simulate a surgical procedure while a simulated fluoroscopic image is presented to him or to her as is described below. And, in step 12, after the simulated surgery has been completed, a measurement of the student's proficiency is derived inter alia from the time the student takes to complete the simulation and from the radiation dose that would have been delivered to the patent had the procedure been carried out on a living patient. Other factors can be taken into consideration as well. For example, this derivation can in part be based on the achievement of a surgical goal. All this will be described in more detail below.

Figure 2:
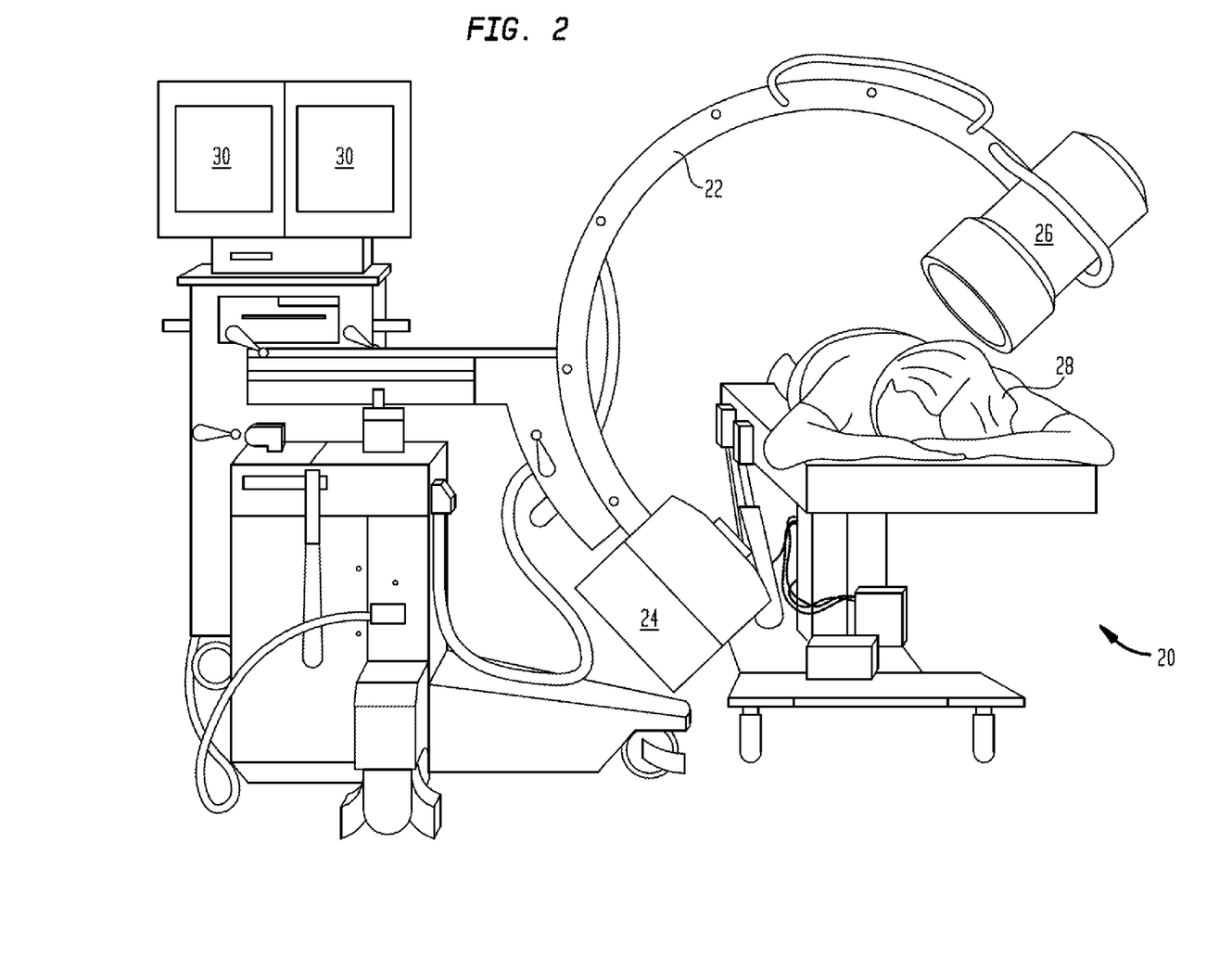
FIG. 2 illustrates a conventional c-arm fluoroscope.

Referring now to FIG. 2, a C-arm fluoroscope 20 is shown. The C-shaped gantry 22 of the fluoroscope 20 has an X-ray source 24 at one end and an image intensifier 26 at the other. The X-ray source 24 directs low-intensity X-rays through a patient 28 to the image intensifier 26. Circuitry (not shown) between the image intensifier 26 and the display 30 of the fluoroscope 20 causes an image of a region of the patient 28 to be displayed on the display 30. In practice, a physician will perform surgery on the patient 28 while the fluoroscope 20 is operating. At various times during the surgery, the physician will be looking into the surgical site in the patient 28; at other times, the physician will be looking at the display 30.

In the course of performing certain surgical operations on a patient (e.g. a patient such as 28) a physician uses a surgical instrument and needs to make sure the instrument is properly located and oriented within the body of the patient. It can be difficult or impossible for the physician to do this visually because the physician cannot walk around the table while the surgery is in progress. For this reason, the physician needs not only to manipulate the instrument itself, but also needs to manipulate gantry controls so that the gantry 20 is moved to a position in which the display 30 shows the desired view of the patient and the instrument.

Apparatus in accordance with a preferred embodiment of the invention allows a medical student to simulate a surgical operation by operating on a model with haptic characteristics similar to those of a human being while operating a simulated fluoroscope.

As can be seen in FIG. 3, a model of a back torso 106 has an opening 112 that exposes a print of a lumbar spine 109. (As discussed above, the lumbar spine 109 is a three-dimensional print of a three dimensional radiological image of a human being.) A medical student (the student's hand 103 is shown) can simulate an operation upon the lumbar spine 109 using an imitation 115 of a surgical instrument.

Figure 4:
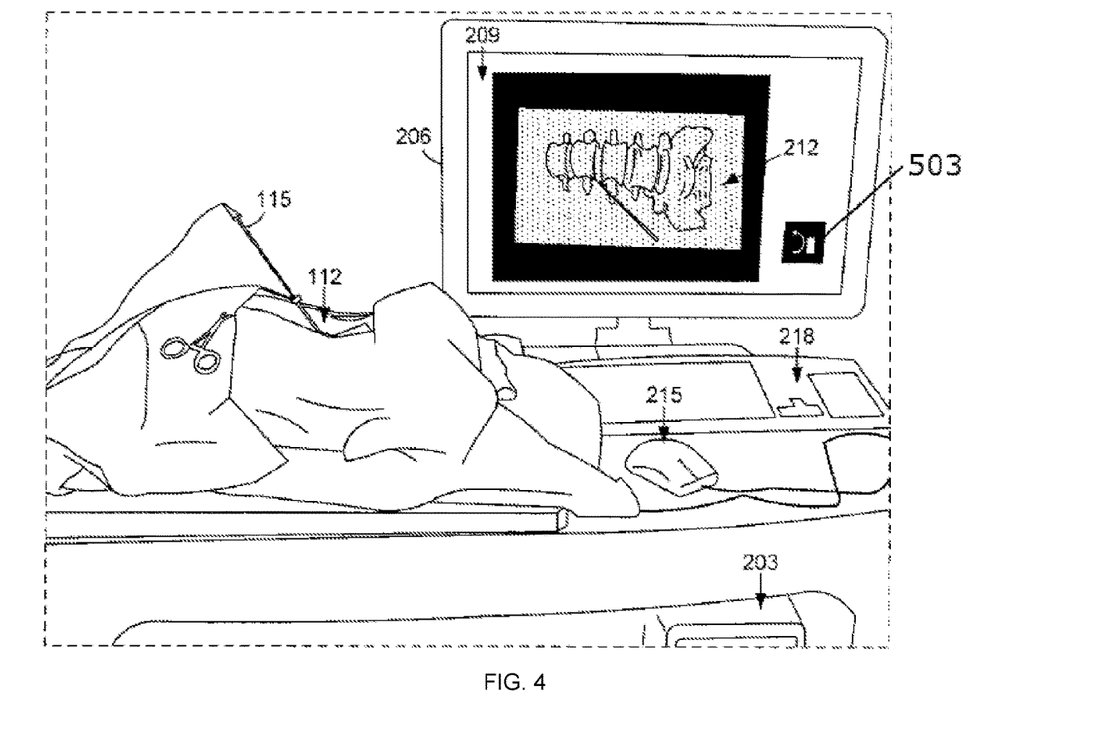
FIG. 4 schematically illustrates the model of FIG. 3 together with a fluoroscope simulator in accordance with a preferred embodiment of the invention.

Turning now to FIG. 4, it can be seen that this model 106 and the imitation instrument 115 are connected to a computer system 203. A three-dimensional radiological image that includes the lumbar spine 109 is stored in the computer system 203.

A display 206 is connected to the computer system and it displays an image 212. In this instance, the image 212 shows the lumbar spine 109 and the imitation instrument 115. The image 212 is created by image processing within the computer system 203 and represents the image that would appear on the display of a c-arm fluoroscope. This is made possible because the spatial location and orientation of the model 106 and the spatial location and orientation of the imitation instrument 115 are registered in the computer system 203, as is the assumed configuration of the gantry of the simulated c-arm fluoroscope. This is achieved using electromagnetic tracking, infrared tracking, or three-dimensional optical tracking to bring the positions of the model 106 and the imitation instrument 115 into the world coordinate system of the apparatus. The assumed configuration of the gantry of the simulated c-arm fluoroscope is also brought into this coordinate system. The computer system 203 uses this information to create a projection of the stored or calculated three-dimensional radiological image, to display the projection on the display 206, and to superpose an image of the imitation instrument 115 upon that projection. Image processing software to create such a projection and to superimpose such an image is commercially available.

Figure 5A:
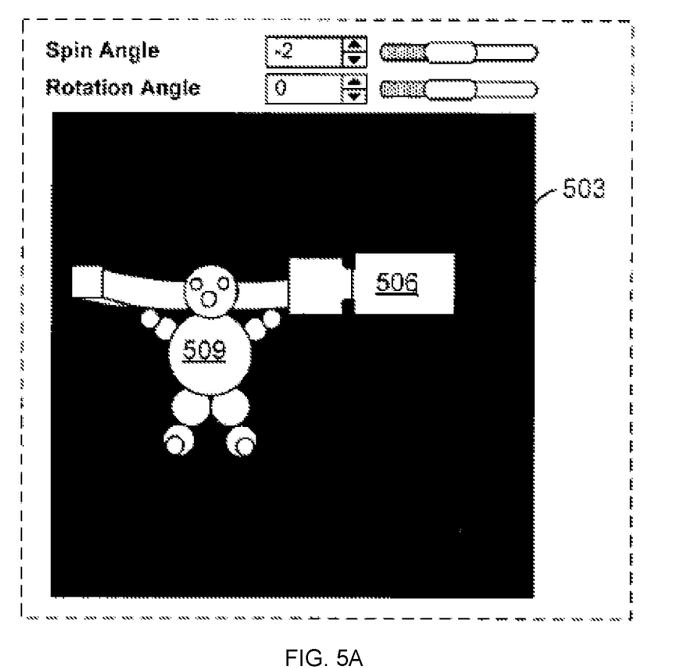
FIGS. 5A and 5B illustrate how the configuration of the gantry of a simulated fluoroscope is displayed by a preferred embodiment of the invention.
Figure 5B:
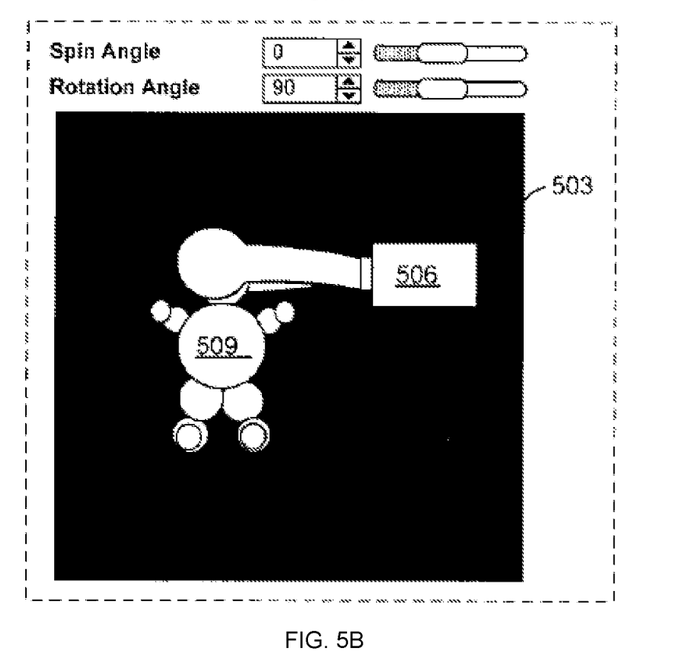

As stated above, during an actual operation a surgeon can reconfigure the gantry of the c-arm fluoroscope to different positions in order to confirm that the surgical instrument is properly located and oriented within the body of the patient. In accordance with the preferred embodiment of the invention, the simulated configuration of the fluoroscope gantry is controlled by operation of the mouse 215 and the keyboard 218 and displayed by the icon 503 on the display 206. These controls mimic the operation of controls of actual c-arm fluoroscopes. As can be seen in FIGS. 5A and 5B, the icon 503 provides an easily-recognizable representation of the configuration of the simulated c-arm fluoroscope. The icon 503 has two components: a gantry indicator 506 and a patient body indicator 509. In FIG. 5A, the icon 503 shows the simulated radiation source to be in line with the patient's right ear and the simulated image intensifier to be in line with the patient's left ear, while in FIG. 5B the simulated radiation source is behind the patient's head and the simulated image intensifier is in front of the patient's face.

During a surgery, a surgeon will turn the fluoroscope on and off by operating a footswitch. In accordance with the preferred embodiment of the invention, a footswitch (not shown) is provided. The footswitch simulates the operation of a fluoroscope; when the medical student depresses it, the image 212 appears on the display 206. When the medical student releases the footswitch, the simulated fluoroscopic system stops producing new images and the last image 212 remains displayed. And, it is also possible for the medical student to simulate the operating characteristics (e.g. the intensity of the x-ray radiation, the size of the collimator opening, the image level, the energy window) of the fluoroscope using the mouse 215 and keyboard 218.

Figure 6:
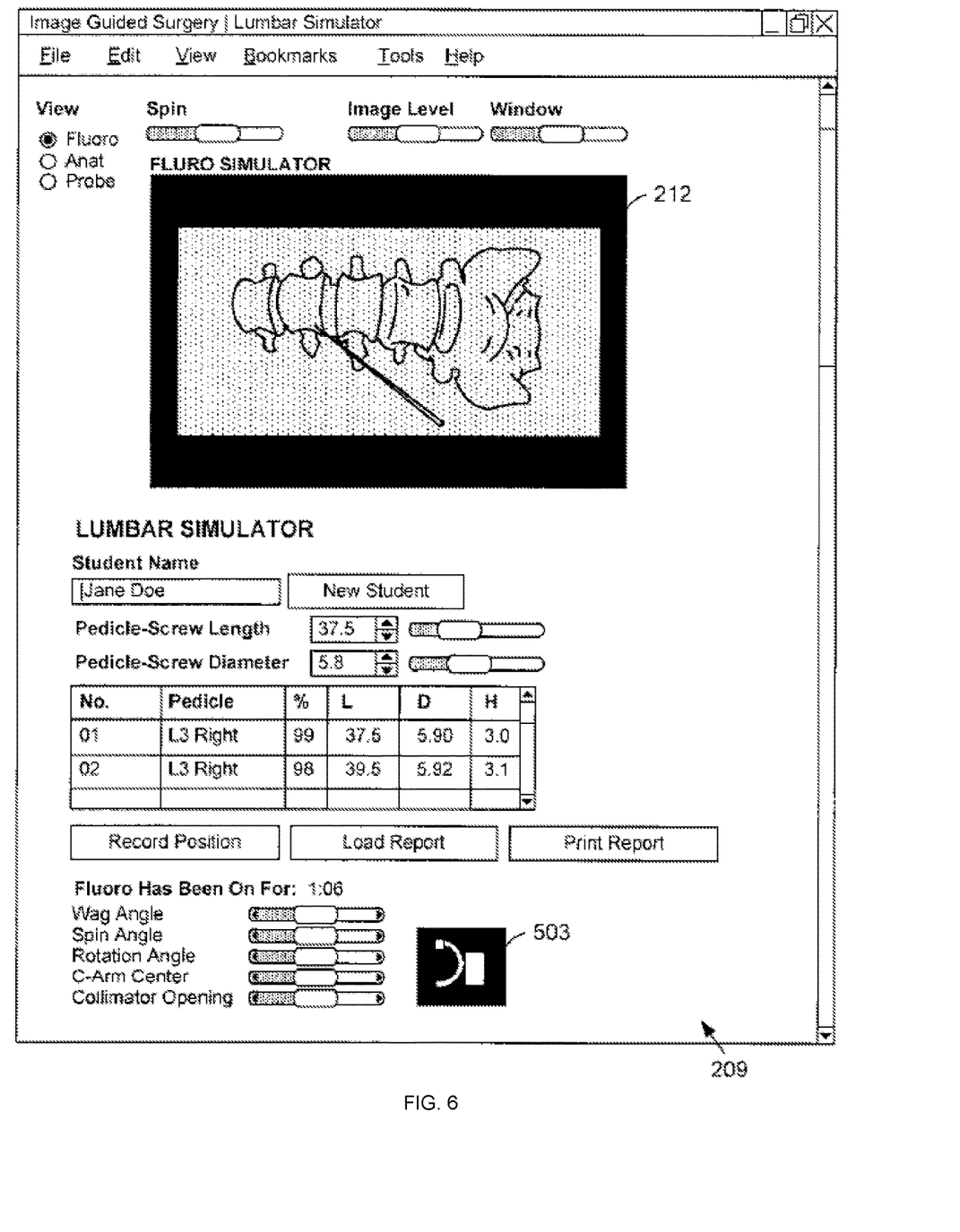
FIGS. 6 and 7 illustrate screens that can be displayed to a practitioner during a simulation of a surgical procedure in which spinal instrumentation is installed.
Figure 7:
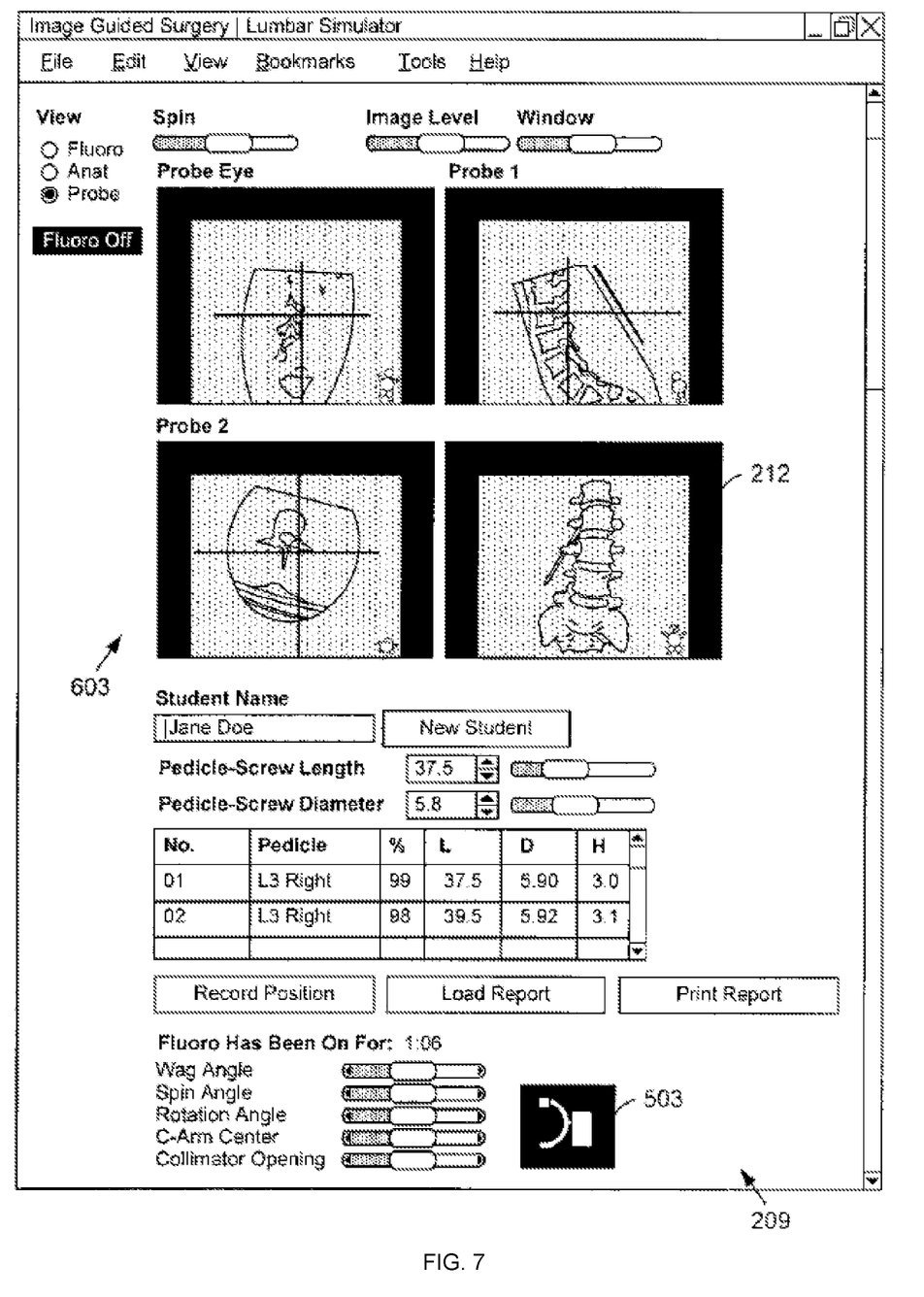

A medical student can use a model such as model 106 to simulate implantation of spinal instrumentation. In that case, each individual lumbar disc will be printed as a separately instrumented submodel so that it can be moved independently from the other lumbar discs. And, images of pedicle screws, rods, and other hardware can be stored in the computer system 203 and superimposed on the image 212, thereby permitting the medical student to simulate surgery that corrects spinal alignment. FIGS. 6 and 7 show exemplary screens on the display 206 that can be used to indicate inter alia the sizes and locations of pedicle screws that a medical student has chosen to install in a simulation of implantation of spinal instrumentation.

Figure 8:
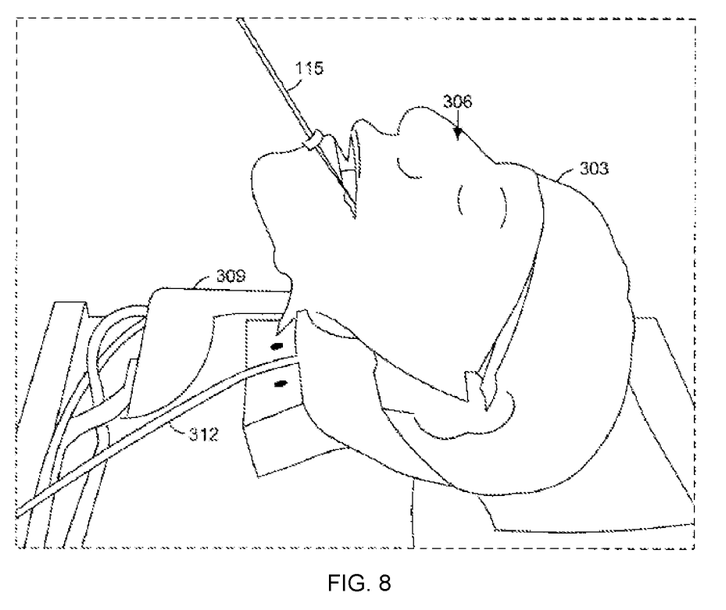
FIGS. 8 and 9 schematically illustrate a model of a head as used in a preferred embodiment of the invention.
Figure 9:
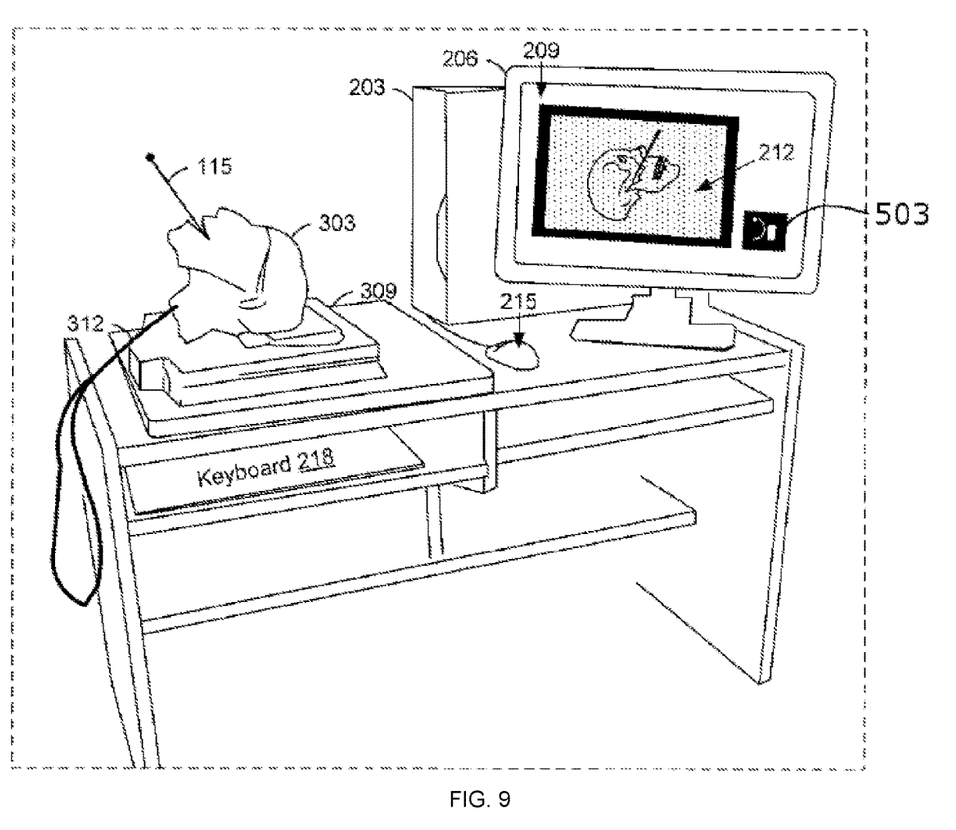
Figure 10:
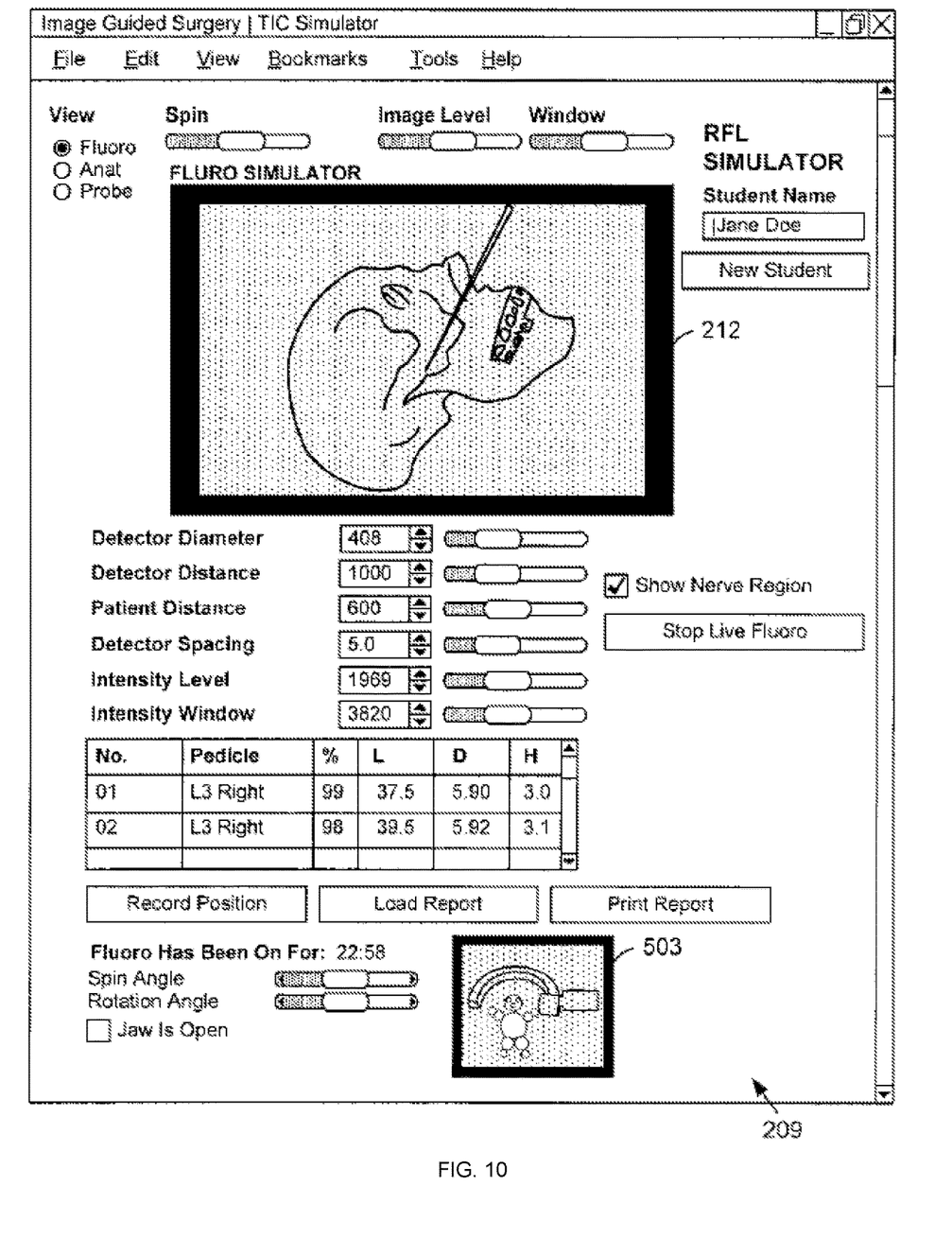
FIG. 10 illustrates a screen that can be displayed to a practitioner during a simulation of a surgical procedure to address trigeminal neuralgia.

FIGS. 8 and 9 show another model 303 upon which a medical student can simulate surgery for trigeminal neuralgia. In this example, an electromagnetic sensor 309 registers the spatial location and orientation of the model 303 and the imitation surgical instrument 115 (in this example, the imitation instrument 115 is an RF knife used to ablate the trigeminal nerve) that is hard-wired to the computer system 203. The electromagnetic sensor 309 is connected to the computer system 203 via wire 312 in order to register the model 303 and the imitation instrument 115 in the world coordinate system of the apparatus. Although it would be possible to use a wireless sensor for the sensor 309, a wired connection was chosen because of the high positional accuracy required. And, while this embodiment uses electromagnetic tracking it is alternatively possible to use infrared tracking or three-dimensional optical tracking instead. FIG. 10 shows a screen that may be displayed on the display 206 during a simulation of a procedure to relieve trigeminal neuralgia.

Advantageously, the preferred embodiment of the invention provides a way to evaluate a medical student's proficiency in simulating a surgical operation. This is done by inter alia determining the time the medical student requires to complete the simulation, the radiation dose that the medical student delivers during the simulation. (The radiation dose is determined by the intensity of the x-ray radiation that the medical student chooses to use and the length of time that the medical student has chosen to keep the fluoroscope operating.) This information is used to derive a measurement of the student's proficiency. Advantageously, the derivation can also include other measurements related to the specific surgical procedure that the medical student is simulating. For example, if the student is practicing implantation of spinal instrumentation, the amount of the screw that detrudes from the bone can be taken into account in deriving a measurement of the student's proficiency. Alternatively, if the student is simulating a procedure to address trigeminal neuralgia, the measurement of the student's proficiency can be downgraded if the imitation RF knife is inserted into the incorrect branch of the trigeminal nerve.

Advantageously, a medical student will be required to perform a simulation of a particular surgical operation on a plurality of models, each of which represents a particular body type or patient. Thus, for example, a medical student may be required to simulate a particular spinal operation on an obese female, an infant, and on an adolescent with a football injury.

The model can include a plurality of three-dimensional submodels of actual anatomical structures of a living being, each of such plurality having haptic characteristics of the corresponding actual structure, and wherein the first means comprises means for individually registering the spatial location and orientation of each of the plurality of submodels.

The system can include means for recording movement of the model and submodels therein, movement of the imitation instrument, and operation of the controls. The system can include means for deriving at least one measure of quality from information recorded by the means for recording.

In some embodiments, a method of teaching a medical student to perform a surgical operation on a human being is provided, the operation being of a type that is conventionally performed using a fluoroscope, the method including providing the student with a model upon which the student can perform a simulation of the surgical operation, the model containing a three-dimensional print of a three-dimensional radiological image of an anatomical structure of interest of a human being and the print having haptic characteristics similar to those of the structure of interest; providing the student with a three-dimensional imitation of an actual surgical instrument of a type that is suitable for performing the surgical operation; providing the student with a fluoroscope simulator in which the three-dimensional radiological image is stored or computed, the simulator having first means for registering the spatial locations and orientations of the model and the print, second means for registering the spatial location and orientation of the imitation instrument, controls simulating the operating characteristics and configuration of a fluoroscope, and a display for displaying a simulated fluoroscopic image corresponding to the spatial locations and positions of the region and the submodels therein and the imitation instrument and the simulated fluoroscope operating characteristics and configuration;

requiring the student to perform a simulation of the operation on the model using the imitation surgical instrument while operating the controls; registering movement of the imitation instrument and operation of the controls during performance of the simulation of the operation; and using the duration of the simulated operation and the simulated dose delivered during performance of the simulation of the operation to derive a measurement of the student's proficiency in performing a simulation of the surgical operation.

Although at least one preferred embodiment of the invention has been described above, this description is not limiting and is only exemplary. The scope of the invention is defined only by the claims, which follow:

The invention claimed is:

1. A surgery simulation system, comprising:
   a physical three-dimensional model of an actual anatomical structure of a being located in a three-dimensional co-ordinate system, the physical three-dimensional model being a three-dimensional print generated based at least in part on a three-dimensional image acquired from the being, material forming the physical three-dimensional model having a haptic characteristic similar to the actual anatomical structure of the being;
   an electromagnetic sensor positioned in the three-dimensional co-ordinate system;
   a three-dimensional imitation instrument of an actual surgical instrument of a type that is suitable for performing surgery on the actual anatomical structure; and
   a fluoroscope simulator in which a three-dimensional radiological image of the actual anatomical structure is stored or computed by a computer system, the fluoroscope simulator being configured to:
      register a spatial location and orientation of the physical three-dimensional model in the three-dimensional co-ordinate system relative to the electromagnetic sensor, wherein the spatial location and orientation of the physical three-dimensional model is determined using the electromagnetic sensor;
      register a spatial location and orientation of the three-dimensional imitation instrument in the three-dimensional co-ordinate system relative to the electromagnetic sensor, wherein the spatial location and orientation of the three-dimensional imitation instrument is determined using the electromagnetic sensor;
      generate a simulated fluoroscopic image using the three-dimensional radiological image, the simulated fluoroscopic image comprising a virtualization registered in the computer system of the physical three-dimensional model in accordance with the spatial location and orientation of the physical three-dimensional model in the three-dimensional co-ordinate system and at least one operating characteristic and at least one configuration of a simulated fluoroscope registered in the computer system that is simulated to be in the three-dimensional co-ordinate system by the fluoroscopic simulator, the at least one operating characteristic comprising a simulated intensity of X-ray radiation supplied by an X-ray source of the simulated fluoroscope and a duration of delivery of the X-ray radiation;
      determine a proficiency metric based at least in part on the intensity of the X-ray radiation and the duration of delivery of the X-ray radiation; and
      display a plurality of generated simulated fluoroscopic images that comprise virtualizations registered in the computer system of the physical three-dimensional model in accordance with the spatial location and position of the physical three-dimensional model in the three-dimensional co-ordinate system and a plurality of virtualizations registered in the computer system of the three-dimensional imitation instrument superimposed on the plurality of generated simulated fluoroscopic images in accordance with a simulated location and orientation of the X-ray source registered in the computer system, wherein the plurality of generated simulated fluoroscopic images includes the simulated fluoroscopic image and at least two of the plurality of generated simulated fluoroscopic images display different views of the virtualized three-dimensional model registered in the computer system corresponding to at least two different locations or orientations of the X-ray source of the simulated fluoroscope registered in the computer system.

2. The surgery simulation system of claim 1, wherein the physical three-dimensional model comprises a plurality of physical three-dimensional submodels of corresponding actual anatomical structures of the being, each of the plurality of physical three-dimensional submodels having haptic characteristics of the corresponding actual anatomical structure, and
   wherein a spatial location and orientation of each of the plurality of physical three-dimensional submodels are registered individually.

3. The system of claim 1, further comprising a footswitch that simulates an operation of the simulated fluoroscope, wherein the fluoroscope simulator is further configured to, when the footswitch is depressed:
   generate at least one new simulated fluoroscopic image using the three-dimensional radiological image, the at least one new simulated fluoroscopic image comprising a virtualization of the physical three-dimensional model in accordance with the spatial location and orientation of the physical three-dimensional model in the three-dimensional co-ordinate system and the at least one operating characteristic and the at least one configuration of the simulated fluoroscope; and
   display the at least one new simulated fluoroscopic image with a virtualization of the three-dimensional imitation instrument superimposed on the at least one new simulated fluoroscopic image.

4. The system of claim 3, wherein the fluoroscope simulator is further configured to, when the footswitch is released:
   stop generating the at least one new simulated fluoroscopic image; and
   display a last produced one of the at least one new simulated fluoroscopic image with the virtualization of the three-dimensional imitation instrument.

5. The system of claim 1, wherein the electromagnetic sensor is positioned below the physical three-dimensional model.

6. The system of claim 1, wherein the three-dimensional image is acquired through a computerized tomography (CT) scan or a magnetic resonance imaging (MRI) scan.

7. A surgery simulation system, comprising:
   a physical three-dimensional model of a region of a human, the physical three-dimensional model comprising a plurality of physical three-dimensional submodels of anatomical structures therein, each of the plurality of physical three-dimensional submodels corresponding to a corresponding actual anatomical structure of the human located in the region, the physical three-dimensional model of the region being a three-dimensional print generated based at least in part on a three-dimensional image and each of the plurality of physical three-dimensional submodels having a haptic characteristic similar to the corresponding actual anatomical structure of the region of the human;
a three-dimensional imitation instrument of an actual surgical instrument of a type that is suitable for performing surgery in the region; and
a fluoroscope simulator in which a three-dimensional radiological image of the region and the anatomical structures therein are stored or computed by a computer system, the fluoroscope simulator being configured to:
register a spatial location and orientation of the physical three-dimensional model of the region and individually register a spatial location and orientation of each of the plurality of physical three-dimensional submodels therein, wherein the spatial location and orientation of the physical three-dimensional model is determined using an electromagnetic sensor positioned relative to the physical three-dimensional model;
register a spatial location and orientation of the three-dimensional imitation instrument, wherein the spatial location and orientation of the three-dimensional imitation instrument is determined using the electromagnetic sensor positioned relative to the physical three-dimensional model;
control, in response to user inputs, a simulation of operating characteristics and configuration of a simulated fluoroscope registered in the computer system including a simulated location and orientation of an X-ray source of the simulated fluoroscope registered in the computer system relative to the physical three-dimensional model registered in the computer system, an intensity of X-ray radiation supplied by the X-ray source, and a duration of delivery of the X-ray radiation;
display a simulated fluoroscopic image that comprises a virtualization registered in the computer system of the physical three-dimensional model in accordance with the spatial locations and orientations of the physical three-dimensional model and the plurality of physical three-dimensional submodels therein, and a virtualization of the three-dimensional imitation instrument registered in the computer system relative to the simulated location and orientation of the X-ray source registered in the computer system; and
determine a proficiency metric based at least in part on the intensity of the X-ray radiation and the duration of delivery of the X-ray radiation.

8. The system of claim 7, wherein the fluoroscope simulator is further configured to record movement of the physical three-dimensional model and the plurality of physical three-dimensional submodels therein, movement of the three-dimensional imitation instrument, and operation of the X-ray source of the simulated fluoroscope.

9. The system of claim 8, wherein the fluoroscope simulator is further configured to derive at least one measure of proficiency from information recorded by the fluoroscope simulator.

10. A method of teaching a medical student to perform a surgical operation on a human being, the surgical operation being of a type that is conventionally performed using a physical fluoroscope, the method comprising:
providing the medical student with a three-dimensional physical model upon which the medical student can perform a simulation of the surgical operation, the three-dimensional physical model containing a three-dimensional print of an anatomical structure of interest of a human being based at least in part on a three-dimensional radiological image, the three-dimensional print having haptic characteristics similar to those of the anatomical structure of interest;
providing the medical student with a three-dimensional imitation instrument of an actual surgical instrument of a type that is suitable for performing the surgical operation;
positioning an electromagnetic sensor below the three-dimensional physical model, the electromagnetic sensor in data communication with at least one computing device having a fluoroscope simulator executable thereon;
providing the medical student with the fluoroscope simulator executable on the at least one computing device in which the three-dimensional radiological image is stored or computed by the at least one computing device, the fluoroscope simulator causing the at least one computing device to at least:
register spatial locations and orientations of the three-dimensional physical model and the three-dimensional print using the electromagnetic sensor positioned below the three-dimensional physical model,
register a spatial location and orientation of the three-dimensional imitation instrument using the electromagnetic sensor positioned below the three-dimensional physical model,
simulate a location and an orientation of an X-ray source of a simulated fluoroscope registered in the at least one computing device in accordance with at least one operating characteristic and at least one configuration of the simulated fluoroscope registered in the at least one computing device,
simulate an intensity of X-ray radiation and a duration of delivery of the X-ray radiation supplied from the X-ray source of the simulated fluoroscope registered in the at least one computing device in response to user input by the medical student, and
display a plurality of simulated fluoroscopic images that comprise a virtualization registered in the at least one computing device of the three-dimensional physical model in accordance with the spatial locations and positions of the three-dimensional physical model and a virtualization registered in the at least one computing device of the three-dimensional imitation instrument in accordance with a simulated location and orientation of the X-ray source of the simulated fluoroscope registered in the at least one computing device;
requiring the medical student to perform a simulation of the surgical operation on the three-dimensional physical model using the three-dimensional imitation instrument while operating the X-ray source of the simulated fluoroscope registered in the at least one computing device;
registering movement of the three-dimensional imitation instrument and operation of the X-ray source of the simulated fluoroscope registered in the at least one computing device during performance of the simulation of the surgical operation; and
determining a proficiency metric based at least in part on the simulated duration of delivery of the X-ray radiation and the simulated intensity of the X-ray radiation, the proficiency metric representing a measurement of the student's proficiency in performing the simulation of the surgical operation.

11. The method of claim 10, further comprising:

providing the medical student with a second physical model of a second body type different from a first body type of the three-dimensional physical model;

register spatial locations and orientations of the second physical model using the electromagnetic sensor positioned below the second physical model and requiring the medical student to perform an additional simulation of the surgical operation on the second physical model using the three-dimensional imitation instrument while operating the X-ray source of the simulated fluoroscope.

12. The method of claim 11, wherein the second physical model is a three-dimensional model containing a three-dimensional print of the anatomical structure of interest based at least in part on a three-dimensional radiological image acquired from a human being having the second body type.

13. The method of claim 11, further comprising recording a time the medical student takes to perform each of the simulations of the surgical operation.

14. The method of claim 11, further comprising determining a simulated fluoroscopic dose delivered during each of the simulations of the surgical operation.

* * * * *